(12) United States Patent
Nakasuga et al.

(10) Patent No.: US 8,896,928 B2
(45) Date of Patent: Nov. 25, 2014

(54) ELECTROWETTING DISPLAY

(75) Inventors: Akira Nakasuga, Mishima-gun (JP); Takao Unate, Tsukuba (JP); Takeshi Wakiya, Tsukuba (JP); Shigeki Nomura, Mishima-gun (JP)

(73) Assignee: Sekisui Chemical Co., Ltd., Osaka (JP)

( * ) Notice: Subject to any disclaimer, the term of this patent is extended or adjusted under 35 U.S.C. 154(b) by 123 days.

(21) Appl. No.: 13/825,424

(22) PCT Filed: Sep. 22, 2011

(86) PCT No.: PCT/JP2011/071679
§ 371 (c)(1),
(2), (4) Date: May 7, 2013

(87) PCT Pub. No.: WO2012/039471
PCT Pub. Date: Mar. 29, 2012

(65) Prior Publication Data
US 2013/0222880 A1    Aug. 29, 2013

(30) Foreign Application Priority Data

Sep. 22, 2010  (JP) ................ 2010-212715
Oct. 25, 2010  (JP) ................ 2010-238895
Apr. 19, 2011  (JP) ................ 2011-093079
Apr. 19, 2011  (JP) ................ 2011-093080

(51) Int. Cl.
| | | |
|---|---|---|
| G02B 1/06 | (2006.01) | |
| G02B 3/12 | (2006.01) | |
| G02B 26/00 | (2006.01) | |
| G09F 9/30 | (2006.01) | |
| G09F 9/37 | (2006.01) | |
| G02B 3/14 | (2006.01) | |

(52) U.S. Cl.
CPC ............. *G02B 26/005* (2013.01); *G02B 3/14* (2013.01); *G02B 26/004* (2013.01); *G09F 9/30* (2013.01); *G09F 9/372* (2013.01)
USPC .......................................... 359/665; 359/666

(58) Field of Classification Search
CPC ...... G02B 26/005; G02B 26/004; G02B 3/14; G09F 9/30; G09F 9/372
USPC .................................................. 359/665, 666
See application file for complete search history.

(56) References Cited

U.S. PATENT DOCUMENTS

| | | | |
|---|---|---|---|
| 7,852,547 | B2 | 12/2010 | Kim |
| 2006/0285067 | A1 | 12/2006 | Kim |
| 2009/0027751 | A1 | 1/2009 | Chen et al. |

FOREIGN PATENT DOCUMENTS

| | | |
|---|---|---|
| JP | 2006-350328 | 12/2006 |
| JP | 2008-170586 | 7/2008 |
| JP | 2009-031795 | 2/2009 |
| JP | 2009-210738 | 9/2009 |
| WO | 2005-098797 | 10/2005 |

OTHER PUBLICATIONS

International Search Report for International Application No. PCT/JP2011/071679, mailed on Dec. 20, 2011; and an English translation thereof.

*Primary Examiner* — William Choi
(74) *Attorney, Agent, or Firm* — Greenblum & Bernstein, P.L.C.

(57) ABSTRACT

Provided is an electrowetting device capable of performing bright and high-contrast color display. In addition, provided is an electrowetting device capable of performing high-quality display without unevenness.

The electrowetting device is an electrowetting display in which each of a pair of substrate constituting one cell has a driving unit. A first substrate that stores a first hydrophobic liquid material in regions surrounded by a first pixel wall, and a second substrate that stores a second hydrophobic liquid material in regions surrounded by a second pixel wall are adhered to each other through a hydrophilic material.

13 Claims, 7 Drawing Sheets

ELECTROWETTING DISPLAY

TECHNICAL FIELD

The present invention relates to an electrowetting display.

BACKGROUND ART

Recently, an electrowetting device using an electrowetting effect has attracted attention. In general, in the electrowetting device, a hydrophilic (high surface-energy) liquid and a hydrophobic (low surface-energy) liquid are filled between a pair of substrates, and at least one of the substrates includes an electrode layer formed on a surface thereof, and a hydrophobic intermediate layer (insulating layer) that is formed on a surface of the electrode layer (for example, refer to Patent Document 1). The electrowetting device has the following characteristic. That is, when a voltage is applied between the hydrophilic liquid and the electrode layer through the hydrophobic intermediate layer, the hydrophilic liquid may be attracted to the hydrophobic intermediate layer, and thus an interface shape between the hydrophilic liquid and the hydrophobic liquid varies. The electrowetting device is used for an optical lens, a display device, and the like by utilizing the characteristic.

However, in an electrowetting display using the electrowetting device for a display device, as a color display method, a method in which a color filter is combined is disclosed.

However, in the display device in which the color filter is combined, when carrying out display with a reflection type, light that has transmitted through the color filter is mixed even when a white color is intended to be displayed. Therefore, light extraction efficiency decreases, and thus the screen becomes dark. In addition, when displaying a single color, a mixed color of the white color and the single color appears, and thus chroma of the single color decreases. As a result, contrast of the display device that is obtained becomes low. As described above, in the electrowetting device using the color filter, there is a problem in that bright and high-contrast color display may not be performed.

In addition, Patent Document 1 discloses a method of forming a hydrophobic liquid layer on a surface of the substrate as a method that is very suitable for manufacturing of the electrowetting display. In the method disclosed in Patent Document 1, the substrate surface is covered with a hydrophilic liquid layer at first. An opening of a dispenser is disposed inside the hydrophilic liquid layer and at an upper side of the substrate surface, the hydrophobic liquid is filled in the dispenser, and thus liquid droplets of the hydrophobic liquid are formed between the opening of the dispenser and the substrate surface. The substrate surface has hydrophobic first regions, and each of the first regions is surrounded by a hydrophilic second region (a pixel wall). When the dispenser is allowed to move along the substrate surface, the liquid droplets of the hydrophobic liquid are attracted to the first region, and the hydrophilic liquid, which comes into contact with the first region, is substituted with the hydrophobic liquid layer, and the hydrophilic liquid, which comes into contact with the second region, is left as is. In the method disclosed in Patent Document 1, a treatment device that is developed for performing filling in the electrowetting device is necessary. In addition, in the method, a relatively long time is taken, and thus there is a problem in that it is difficult to apply the method to a large-sized substrate.

In addition, Patent Document 2 discloses a method of forming an interface shape between a first liquid and a second liquid, one of these being a conductive (hydrophilic) liquid and the other being an insulating (hydrophobic) liquid. In the method, a container having a liquid introduction port and a liquid discharge port is prepared, the first liquid is filled inside the container, and the second liquid is introduced into the container. However, in the method disclosed in Patent Document 2, there is a problem in that the hydrophobic liquid is partially agglomerates and thus unevenness occurs.

CITATION LIST

Patent Literature

[PTL 1] PCT international Publication No. WO05/098797
[PTL 2] Japanese Unexamined Patent Application, First Publication No. 2008-170586

SUMMARY OF INVENTION

Technical Problem

An object of the invention is to provide an electrowetting device capable of performing bright and high-contrast color display. In addition, another object of the invention is to provide an electrowetting device capable of performing high-quality display without unevenness.

Solution to Problem

An electrowetting device related to a first aspect of the invention is an electrowetting display in which each of a pair of substrates constituting one cell has a driving unit. A first substrate that stores a first hydrophobic liquid material in regions surrounded by a first pixel wall, and a second substrate that stores a second hydrophobic liquid material in regions surrounded by a second pixel wall are adhered to each other through a hydrophilic material.

According to the electrowetting display of the invention, the driving units of the first substrate and the second substrate are driven independently, respectively, and thus an interface shape between each of the first hydrophobic liquid material and the second hydrophobic liquid material and the hydrophilic material may be made to vary. Accordingly, for example, transmission of various colors of light of the regions surrounded by the pixel wall on a second substrate side may be selectively allowed by using the regions surrounded by the pixel wall on a first substrate side as a light shielding shutter. As a result, full color display may be carried out without using a color filter, and thus bright and high-contrast color display may be carried out.

In addition, in the electrowetting display, a hydrophobic liquid material having light shielding properties may be stored as a first hydrophobic liquid material in the regions surrounded by the first pixel wall, and two or more kinds of hydrophobic liquid materials, which contain a coloring material, may be stored as the second hydrophobic liquid material in the regions surrounded by the second pixel wall, respectively.

According to this configuration, the above-described bright and high-contrast color may be realized.

In addition, in the electrowetting display, the second hydrophobic liquid material may correspond to each color of RGB (Red, Green, Blue), CMY (Cyan, Magenta, Yellow), RGGB (Red, Green, Green, Blue), or RGBY (Red, Green, Blue, Yellow).

According to this configuration, the above-described bright and high-contrast color may be realized.

In addition, in the electrowetting display, in at least one of each of the regions surrounded by the first pixel wall and each of the regions surrounded by the second pixel wall, a protrusion having a height lower than the height of each of the pixel walls, or an undulation having a height lower than the height of each of the pixel walls may be provided.

According to this configuration, since the protrusion or the undulation is provided, in a voltage not-application state, the hydrophobic liquid material that is stored in the regions surrounded by the pixel wall has a large-thickness portion and a small-thickness portion. Accordingly, an interface shape between the hydrophilic material and the hydrophobic liquid material during voltage application may be made to easily vary due to the small-thickness portion. As a result, an amount of the hydrophobic liquid material that remains in the pixel during voltage application may be controlled, and thus a depth of an intermediate color may be controlled by controlling a value of voltage that is lower than a maximum application voltage, whereby gradation display of a color image may be carried out in a satisfactory manner.

In addition, in the electrowetting display, the hydrophilic material may be a gel-like material.

According to this configuration, since the hydrophilic material is formed from a gel-like material, the hydrophilic material is applied to at least one of the first substrate and the second substrate, and then the two substrates may be adhered to each other. Accordingly, a manufacturing process of the electrowetting display may be simplified, and thus cost may be reduced.

In addition, in the electrowetting display, the height of at least one of the first pixel wall and the second pixel wall may be set to be 2 to 20 times the height of the hydrophobic liquid materials, which are stored by the first pixel wall and the second pixel wall, respectively, in a voltage not-application state.

According to this configuration, since the height of the pixel walls is set within a predetermined range, the hydrophobic liquid material may be made to move in a satisfactory manner.

In addition, in the electrowetting display, in at least one of the first substrate and the second substrate, a surface thereof on a side at which each of the pixel walls is provided, and each of the pixel walls may have hydrophobicity.

According to this configuration, since not only the surface on a side at which the pixel wall is provided, but also the pixel wall may be made to have hydrophobicity, the hydrophobic liquid material may be stored in the regions surrounded by the pixel wall in a relatively uniform manner.

An electrowetting device related to a second aspect of the invention is an electrowetting display including a first substrate, a second substrate that is disposed to be opposite to the first substrate, and a hydrophobic liquid material that is stored in regions surrounded by a pixel wall that is provided to the second substrate. The first substrate and the second substrate are disposed to be opposite to each other through a hydrophilic gel-like material.

According to the electrowetting display of the invention, since the hydrophilic gel-like material is used, the first substrate having a layer formed from a hydrophilic gel-like material on a surface thereof, and the second substrate having a layer uniformly formed from the hydrophobic liquid in regions surrounded by a pixel wall on a surface thereof may be prepared independently, the electrowetting display is constructed by adhering these substrates to each other. Accordingly, a high-quality electrowetting display without unevenness may be provided.

In addition, in the electrowetting display, the hydrophobic liquid material may contain a hydrophobic solvent and a coloring material.

According to this configuration, since the hydrophobic liquid material that contains the coloring material is stored in the regions surrounded by the pixel wall, bright and high-contrast color display may be carried out.

In addition, in the electrowetting display, two or more kinds of the hydrophobic liquid materials, which contain the coloring material having a color different in each case, may be stored in regions surrounded by the pixel wall different in each case, respectively.

According to this configuration, a display capable of displaying various colors may be provided.

In addition, in the electrowetting display, the pixel wall and a surface of the second substrate on a side at which the pixel wall is provided may have hydrophobicity.

According to this configuration, since not only the surface on a side at which the pixel wall is provided, but also the pixel wall may be set to have hydrophobicity, the hydrophobic liquid material may be stored in the regions surrounded by the pixel wall in a relatively uniform manner.

In addition, a height of the pixel wall may be set to be 2 to 20 times the height of the hydrophobic liquid material that is stored in a voltage not-application state, or the height of the pixel wall may be equal to a gap between cells.

That is, even in a situation in which each pixel is closed by the pixel wall, movement of the hydrophobic material, that is, switching of pixel is possible.

According to this configuration, since the height of the pixel wall is set within a predetermined range, and thus the hydrophobic liquid material may be moved in a satisfactory manner.

In addition, in the electrowetting display, a surface of the second substrate on a side at which the pixel wall is provided, and the pixel wall may have hydrophobicity.

According to this configuration, since not only the surface on a side at which the pixel wall is provided, but also the pixel wall may be set to have hydrophobicity, the hydrophobic liquid material may be stored in the regions surrounded by the pixel wall in a relatively uniform manner.

Advantageous Effects of Invention

According to the invention, bright and high-contrast color display may be carried out. In addition, according to the invention, high-quality display without unevenness may be carried out.

DESCRIPTION OF EMBODIMENTS

Hereinafter, embodiments related to an electrowetting display of the invention will be described.

(First Embodiment)

Figure 1:
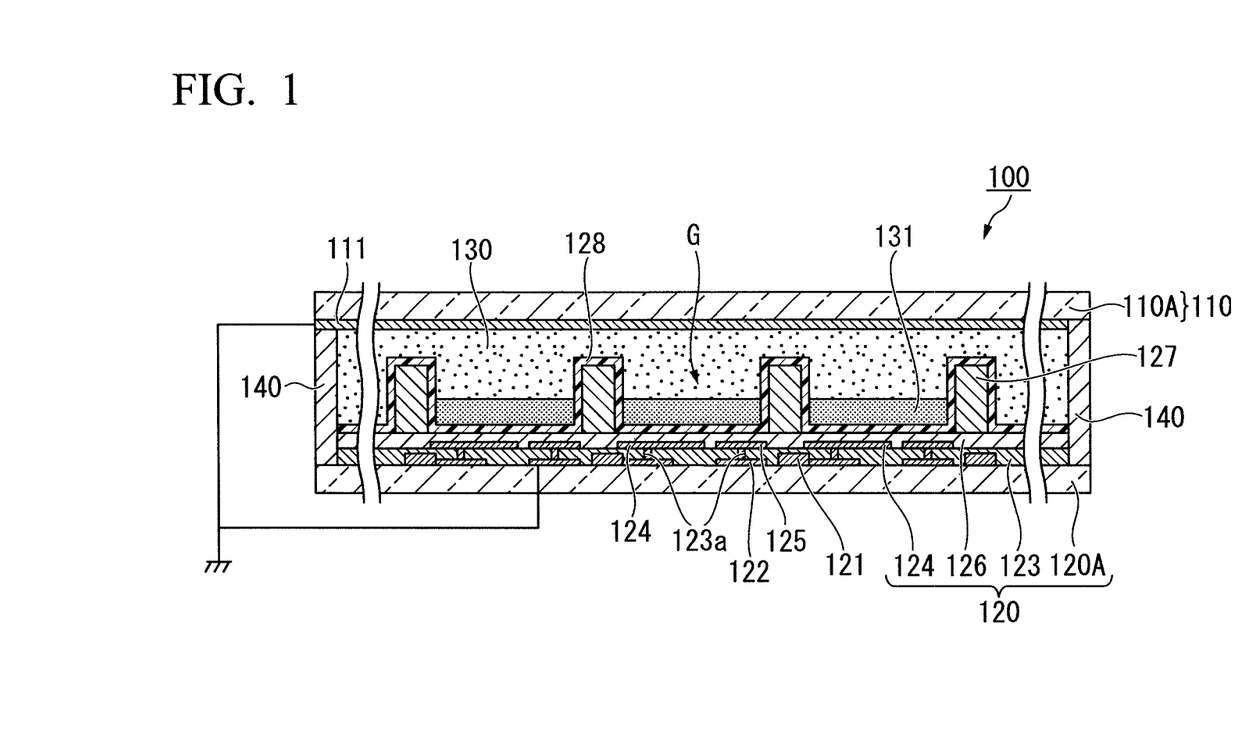
FIG. 1 is a diagram illustrating a cross-sectional configuration of an electrowetting display related to a first embodiment.
Figure 2:
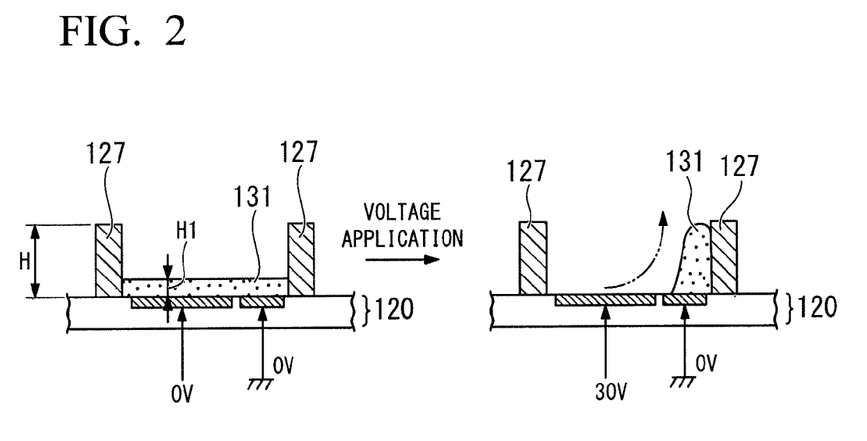
FIG. 2 is a diagram illustrating an operational concept of the electrowetting display.

FIG. 1 shows a schematic diagram illustrating a cross-sectional configuration of an electrowetting display related to this embodiment, and FIG. 2 shows a diagram illustrating an operational concept of the electrowetting display. In addition, in FIG. 2, configuration of portions, which are not necessary for explanation, is simplified.

As shown in FIG. 1, an electrowetting display 100 includes a first substrate 110 and a second substrate 120, and these substrates 110 and 120 are disposed to be opposite to each other through a hydrophilic layer 130. The hydrophilic layer 130 is disposed at a region partitioned by a sealing member 140 that is provided along the outer periphery of the substrates 110 and 120.

The second substrate 120 includes a base material 120A, a TFT 121, a wiring portion 122, a planarization film 123, a pixel electrode 124, a common electrode 125, and an insulating film 126. The base material 120A is constituted by, for example, materials such as glass, a resin molded body, and a film that are commonly used as a panel substrate of a display device. In this embodiment, for example, the glass is used. The pixel electrode 124 and the common electrode 125 are formed on the planarization film 123, and are connected to the TFT 121 and the wiring portion 122 through a contact hole 123a.

As a material that constitutes the pixel electrode 124 and the common electrode 125, ITO, Al, or the like is used. In a case of using ITO as the electrode material, the electrowetting display 100 becomes a so-called transmissive display provided with a light source (not shown) on a rear surface side of the second substrate 120. In addition, in a case of using Al as the electrode material, the electrowetting display 100 becomes a so-called reflective display that reflects external light on an electrode surface. The invention is applicable to a transmissive display, a reflective display, or a transflective display. The common electrode 125 is led out to the outside through the wiring portion 122 and is grounded.

The first substrate 110 is mainly constituted by the base member 110A. The base member 110A is constituted by, for example, materials such as glass, a resin molded body, and a film that are commonly used as a panel substrate of a display device. In this embodiment, for example, the glass is used. A transparent conductive film 111 is formed on a surface of the base member 110A. The transparent conductive film 111 is configured by, for example, ITO, IZO, a conductive polymer, a conductive nano wire, or the like. The transparent conductive film 111 comes into contact with the hydrophilic layer 130 and thus has the same electric potential. In addition, a part of the transparent conductive film 111 is formed in a state of leading out to the outside of the sealing member 140, and is connected to the common electrode 125 at the outside through the wiring portion 122 provided to the second substrate 120, and each of these is grounded. In addition, a surface of the transparent conductive film 111 has hydrophilicity. As a method of applying hydrophilicity to the surface of the transparent conductive film 111, UV cleaning and plasma cleaning are effective, and a uniform hydrophilic surface may be obtained by these methods.

A pixel wall 127 is formed on the insulating film 126 of the second substrate 120. The pixel wall 127 is formed in a lattice shape, and partitions a plurality of pixels G on the second substrate 120. The pixel electrode 124 and the common electrode 125 are disposed in each of the pixels G in a pair. A hydrophobic liquid material 131 is stored in regions partitioned by the pixel wall 127.

In the electrowetting display 100, when a predetermined voltage is applied to the pixel electrode 124, as shown in FIG. 2, a degree of hydrophobicity on a surface of the pixel electrode 124 is mitigated, and a degree of hydrophilicity becomes strong, and thus the hydrophilic layer 130 may be attracted. At this time, a shape of the hydrophobic liquid material 131, which gets familiar with the pixel electrode 124, is changed to a shape that is convex on the common electrode 125 due to a force of the hydrophilic layer 130. As described above, when the hydrophobic liquid material 131 inside the pixels G is allowed to selectively move onto the common electrode 125, a state in which light transmitting through each of the pixels G transmits through the hydrophobic liquid material 131 and a state in which the light approximately transmits through the hydrophobic liquid material 131 may be changed.

The present inventors have found that when a height H of the pixel wall 127 is set to be higher than a maximum height of the hydrophobic liquid material 131 during voltage application, contamination (display unevenness) of a display screen due to the hydrophobic liquid material 131 may be suppressed. That is, they has found that it is more preferable that the height H of the pixel wall 127 be set to be 2 to 20 times a height H1 of the hydrophobic liquid material 131 during a voltage not-application state (refer to FIG. 2).

More specifically, a preferable lower limit is 2 to 5 times the height of the hydrophobic liquid material 131 in a voltage not-application state, and a preferable upper limit is 8 to 20 times the height of the hydrophobic liquid material 131 in the voltage not-application state. When the height of the pixel wall 127 is less than two times the height of the hydrophobic liquid material 131 in the voltage not-application state, the hydrophobic liquid material 131 does not gather to the pixel wall 127 during voltage application, and the inside of the pixels G may not enter a transparent state. In addition, sometimes, the hydrophobic liquid material 131 climbs over the pixel wall 127, and thus a pigment liquid of the hydrophobic liquid material 131 may flow to peripheral pixels G When the height of the pixel wall 127 exceeds 20 times the height of the hydrophobic liquid material 131 in the voltage not-application state, a voltage that is necessary for the hydrophilic layer 130 to push the hydrophobic liquid material 131 becomes very high. Therefore, it is necessary for the TFT 121 to have a withstand voltage characteristic, and there is a tendency for short-circuit due to a leakage current to occur. A more preferable lower limit of the pixel wall 127 is 4 times the height of the hydrophobic liquid material 131 in the voltage not-application state, and more preferable upper limit of the pixel wall 127 is 10 times the height of the hydrophobic liquid material 131 in the voltage not-application state.

In a case where the height of the pixel wall is within this range, when this height is the same length as a cell gap, even in a situation in which each of the pixel is closed by the pixel wall, movement of the hydrophobic material, that is, switching of pixels is possible because the surface of the pixel wall has hydrophobicity.

The hydrophobic liquid material 131 contains a hydrophobic solvent and a coloring material. The hydrophobic solvent is not particularly limited, and examples thereof include alkanes such as decane, undecane, dodecane, and hexadecane, silicone oil, fluorocarbon, and the like. These hydrophobic solvents may be used alone or in combination of two or more kinds.

In addition, the coloring material is not particularly limited, and it is possible to use various kinds of pigments or dyes such as an inorganic pigment or dye, an organic pigment or dye such as phthalocyanine, azos, and anthraquinone, and the like. With regard to characteristics of a solution that is used for the electrowetting, it is necessary for the solution to be dissolved in the hydrophobic liquid, but not to be dissolved in the hydrophilic liquid. The pigment or dye is used after a surface thereof is appropriately subjected to a hydrophobic treatment. In a case of not using the coloring material, the hydrophobic solvent may be used as the hydrophobic liquid material 131.

In the electrowetting display 100 related to this embodiment, two or more kinds of the hydrophobic liquid materials 131, which contain coloring agents different from each other, are stored in the pixels G surrounded by the pixel wall 127 different in each case, respectively. According to this configuration, even when a color filter is not provided to either on a first substrate 110 side or on a second substrate 120 side, multi-color display may be realized.

In a case of carrying out color display, as the hydrophobic liquid materials 131 that are stored in the pixels G surrounded by the pixel wall 127, it is preferable to use three kinds of hydrophobic liquid materials (for example, corresponding to RGB (Red, Green, Blue) or CMY (Cyan, Magenta, Yellow)) or four kinds hydrophobic liquid materials (for example, corresponding to RGGB (Red, Green, Green, Blue) or RGBY (Red, Green, Blue, Yellow)).

In this embodiment, three kinds of hydrophobic liquid materials 131, which are obtained by dissolving Blue No. 403, Yellow No. 204, and Red No. 225 (manufactured by Kiriya Chemical Co., Ltd.) in hexadecane (manufactured by Wako Pure Chemical Industries, Ltd.), respectively, in such a manner that each pigment becomes 2.5 wt %, are used as the coloring material.

The present inventors has found that the electrowetting device 100, in which unevenness in the pixels G is small and which is excellent in responsiveness, may be manufactured by allowing all of the regions (pixels G) that store the hydrophobic liquid material 131 and are surrounded by the pixel wall 127 to have hydrophobicity.

That is, in a case where the pixel wall 127 has hydrophilicity, wettability between the hydrophilic layer 130 and the pixel wall 127 becomes high, and wettability between the hydrophobic liquid material 131 and the pixel wall 127 becomes low, and thus energy in interface change at a surface of the pixel wall 127 from the hydrophilic layer 130 to the hydrophobic liquid material 131 increases. As a result, this becomes a cause of unevenness during voltage application.

Therefore, this embodiment has a configuration in which the hydrophobicity is applied to a surface of the second substrate 120 on a side at which the pixel wall 127 is provided and the pixel wall 127. Examples of a method of applying hydrophobicity include a method of forming a hydrophobic intermediate layer (hydrophobic film) on the second substrate by applying a coating material, and the like. In this embodiment, the hydrophobic intermediate layer 128 is formed on a surface of the second substrate 120 on a side at which the pixel wall 127 is provided and the pixel wall 127. A coating material that is used to form the hydrophobic intermediate layer 128 is not particularly limited, and examples thereof include coating materials composed of fluoropolymers and alkyl polymers such as polytetrafluoroethylene (Teflon; registered trademark), ETFE (ethylene-tetrafluoroethylene copolymer), PVDF (polyvinylidene fluoride), and polypropylene. In this embodiment, polytetrafluoroethylene is used as the coating material.

In this manner, not only the surface of the second substrate 120 on a side at which the pixel wall 127 is provided but also the pixel wall 127 itself are set to have hydrophobicity, and thus the hydrophobic liquid material 131 may be stored in the regions (pixels G) surrounded by the pixel wall 127 of the second substrate 120 in a relatively uniform manner. Furthermore, a variation of the interface shape between the hydrophilic layer 130 and the hydrophobic liquid material 131 during stoppage of the voltage application may be allowed to occur at a high speed. Accordingly, the electrowetting display 100 that is obtained is excellent in responsiveness, unevenness is reduced, and thus reliability thereof increases.

In this embodiment, a hydrophilic gel-like material is used as the hydrophilic layer 130. In this specification, the "gel-like" represents a state having appropriate flexibility in a certain degree with which a variation of the interface shape between a hydrophilic layer (hydrophilic layer 130) and a hydrophobic layer (hydrophobic liquid material 131) is not hindered during the voltage application as an electrowetting display, and stiffness in a certain degree with which for example, two substrates 110 and 120 adhered during a manufacturing process are not detached from each other even in a downward direction. Furthermore, in a case of forming the hydrophilic layer 130 by application, when the application surface thereof is downwardly inverted, and the application surface is returned to the upper side again, it is necessary for the thickness of the hydrophilic layer to have substantially the same thickness before and after the inverting and returning operation. It is also preferable that the thickness distribution before and after the inverting and returning operation be substantially the same. Specifically, an average application thickness Tave of the hydrophilic layer 130 after the inverting and returning operation is preferably 90% or more of the thickness before the operation. In addition, the maximum application thickness is set as $T_{max}$ and the minimum application thickness is set as Tmin, it is preferable to satisfy an expression of (Tmax−Tmin)/Tave<0.1.

The gel-like material that constitutes the hydrophilic layer 130 is a material that may be obtained by allowing a hydrophilic liquid to gelate. In addition, it is preferable that the gel-like material be an elastic gel. The hydrophilic liquid is not particularly limited, and for example, a nonionic liquid with high polarizability is preferable. Specific examples thereof include water, monovalent or polyvalent alcohols with low molecular weight such as methyl alcohol, ethyl alcohol, and ethylene glycol, and the like. These hydrophilic liquids may be used alone or in combination of two or more kinds.

Examples of a method of allowing the hydrophilic liquid to gelate include a method of adding a gelling agent to the hydrophilic liquid, a method of lowering a temperature of the hydrophilic liquid, a method of combining these methods, and the like.

As the gelling agent, a hydrophilic polymer, an inorganic gelling agent, a low molecular weight gelling agent, or the like is used. Specific examples of the hydrophilic polymer include synthetic polymers such as polyvinyl alcohol, polyvinyl pyrrolidone, polyacrylic acid, and polyhydroxyethyl methacrylate; modified celluloses such as starch, pectin, agarose, mannan, glycogen, carrageenan, cellulose, and carboxy cellulose; high molecular weight polysaccharides such as hyaluronic acid, chitin, and chitosan; low molecular weight oligomer saccharides of these; and the like. In addition, protein, polypeptide, polyamine, glycoprotein, and the like may be exemplified. Specific examples of the inorganic gelling agent include inorganic oxides such as silicon dioxide and titanium dioxide, inorganic hydroxides such as aluminum hydroxide, and the like. Examples of the low molecular weight gelling agent include a surfactant having a long-chain alkyl, and the like.

A mixing amount of the gelling agent is appropriately adjusted in such a manner that movement of the hydrophobic liquid material 131 within the pixel G at the pixel wall 127 is not hindered when a voltage is applied to the pixel electrode 124 and the common electrode 125 in each of the pixels G of the electrowetting display 100. For example, in a case of using polyvinyl alcohol, a preferable upper limit of the mixing amount is 10 wt %.

Figure 3:
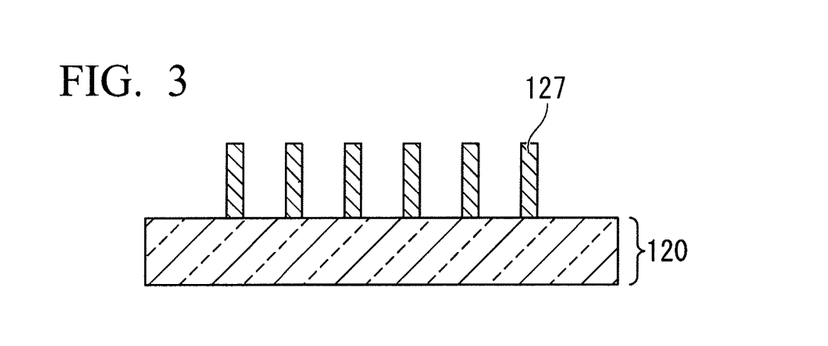
FIG. 3 is a diagram illustrating a manufacturing process of the electrowetting display related to the first embodiment.

Next, description will be made with respect to an example of a method of manufacturing the electrowetting display 100 with reference to FIGS. 3 to 6. First, as shown in FIG. 3, the second substrate 120 manufactured by a method in the related art is prepared, and the pixel wall 127 is formed in the second substrate 120 with a height of 40 μm by using a photoresist (SU-8; manufactured by NIPPON KAYAKU Co., Ltd.).

Figure 4:
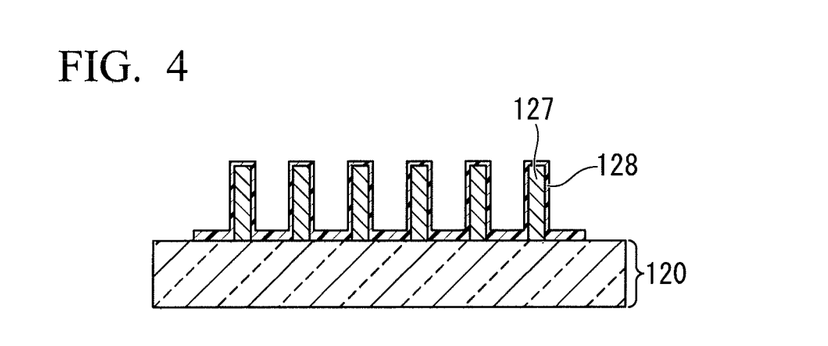
FIG. 4 is an explanatory diagram of a manufacturing process that continues from FIG. 3.

Subsequently, as shown in FIG. 4, with regard to the second substrate 120 having the pixel wall 127, the hydrophobic intermediate layer 128 is coated on the entire surfaces of the pixel wall 127 and the second substrate 120 by a spin coating method using a polytetrafluoroethylene solution (AF1600; manufactured by Du Pont Kabushiki Kaisha). In addition, the hydrophobic pixel wall 127 may be formed by using a dry photoresist, an acrylic photoresist, or the like.

In this embodiment, since the pixel wall 127 and the surface of the second substrate 120, which constitutes the pixels G, are set to have hydrophobicity due to the hydrophobic intermediate layer 128, unevenness may be prevented from occurring in the hydrophobic liquid material 131 disposed in the respective pixels G.

Figure 5:
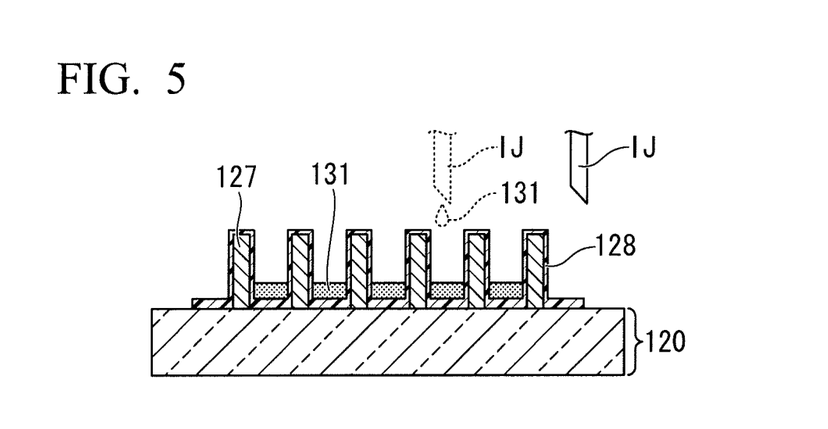
FIG. 5 is an explanatory diagram of a manufacturing process that continues from FIG. 4.

Subsequently, as shown in FIG. 5, three kinds of the hydrophobic liquid materials 131 are disposed in the pixels G of the second substrate 120 having the hydrophobic intermediate layer 128, respectively, by an inkjet device IJ. Here, the hydrophobic liquid materials 131 are disposed within regions surrounded by the pixel wall 127 different in each case, respectively. The thickness of each of the hydrophobic liquid materials 131 that are disposed in the pixels G is set to 5 μm. That is, in this embodiment, the height H of the pixel wall 127 is set to be 8 times the height H1 in the voltage not-application state (refer to FIG. 2).

A method of disposing the hydrophobic liquid material 131 in the pixel G is not particularly limited, and for example, screen printing, flexography, a gravure printing method, a dispensing method, and the like may be used in addition to the inkjet method. When using these methods, two or more kinds of hydrophobic liquid materials 131, which contain coloring materials different from each other, may be stored in the pixels G surrounded by the pixel wall 127 different in each case. As described later, when the hydrophilic layers 130 are disposed by application or the like, a display device capable of performing color display may be easily manufactured even when a color filter is not provided with respect to either the first substrate 110 or the second substrate 120.

Figure 6:
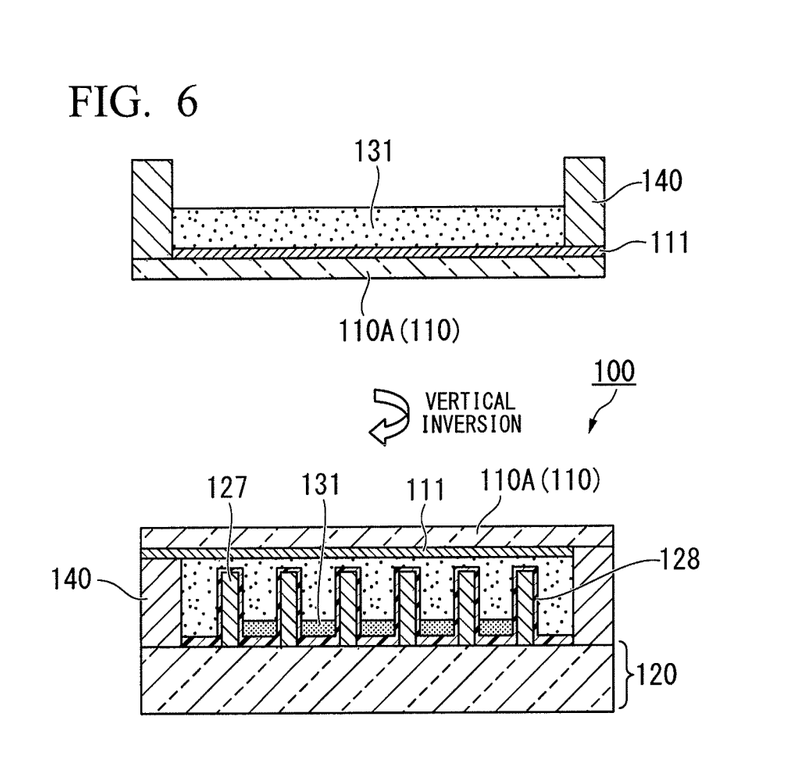
FIG. 6 is an explanatory diagram of a manufacturing process that continues from FIG. 5.

Subsequently, the first substrate 110 and the second substrate 120 are adhered through the hydrophilic layer 130. Specifically, as shown in FIG. 6, the base material 110A (first substrate 110) on which the sealing member 140 is disposed along the outer periphery thereof is prepared, and then the hydrophilic layer 130 is disposed at an inner side of the base material 110A in which the transparent conductive film 111 is formed. In addition, the base material 110A in which the hydrophilic layer 130 is disposed is vertically inverted, and then the first substrate 110 and the second substrate 120 are adhered to each other through the sealing member 140. At this time, since the hydrophilic layer 130 is formed from a gel-like material, even when being vertically inverted, the thickness thereof does not greatly vary.

Specifically, in this embodiment, as the hydrophilic layer 130, an aqueous polyvinyl alcohol solution obtained by dissolving polyvinyl alcohol ("k120", manufactured by KURARAY CO., LTD.) in water in a concentration of 2 wt % is set as the hydrophilic gel-like material. The hydrophilic gel-like material that is obtained is applied onto one surface of the base material 110A of the first substrate 110 to have an application thickness of 100 μm by using a knife coater. As the photocurable sealing member 140, A785 (manufactured by SEKISUI CHEMICAL CO., LTD.) is applied onto the first substrate 110, on which the hydrophilic layer 130 is applied, by a dispenser in a frame-drawing manner, whereby a sealing pattern is formed.

The first substrate 110 on which the hydrophilic layer 130 (hydrophilic gel-like material) is applied is adhered to the second substrate 120 in which each of the hydrophobic liquid materials 131 is stored in the respective pixels G through the sealing member 140 under an atmospheric atmosphere, and then the sealing member 140 is irradiated with light of 1000 mJ by an ultrahigh pressure mercury lamp having a central wavelength of 365 nm to be cured, whereby the electrowetting display 100 may be manufactured.

According to this embodiment, since the hydrophilic layer 130 is formed from the gel-like material, even when the hydrophilic layer 130 disposed in the first supporting plate 110 is made to face a lower side, the hydrophilic layer 130 is not dropped. Accordingly, the first supporting plate 110 and the second supporting plate 120 may be easily adhered to each other by using a roll-to-roll method.

As a method of disposing the hydrophilic layer 130 on one surface of the first substrate 110 is not limited to the above-described method, and for example, a method of performing application using a roll coater, a die coater, or the like, and the like may be used. In addition, as the hydrophilic layer 130, a material that gelates during the application on the first substrate 110 or after this application by lowering a temperature, or a fluid (sol) that contains a hydrophilic liquid and a gelling agent may be used.

In addition, any one of a process of disposing the hydrophilic layer 130 on one surface of the first substrate 110, and a process of applying the hydrophobic liquid material 131 within the pixels G surrounded by the pixel wall 127 in the second substrate 120 may be previously performed, or both of these may be simultaneously performed.

In addition, the electrowetting display 100 may be manufactured by adhering the first substrate 110 and the second substrate 120, onto which the hydrophilic layer 130 is applied, respectively, to each other.

When observing the electrowetting display 100, which is obtained by the above-described processes, with a microscope, it is confirmed that the hydrophobic liquid material 131 is uniformly stored in the pixels G surrounded by the pixel walls 127 without unevenness. When application of a pulse voltage of 0 V/20 V at 30 Hz is performed with respect to the pixel electrode 124 of the display 100, an interface shape between the hydrophobic liquid material 131 and the hydrophilic layer 130 varies in response to higher and lower values of the voltage, and as shown in FIG. 2, closing and opening of the pixel regions due to the movement of the hydrophobic liquid material 131 is observed.

As described above, according to the electrowetting display 100 related to this embodiment, since the first substrate 110 and the second substrate 120 are adhered to each other through the hydrophilic layer 130 formed from a gel-like material. Accordingly, the first substrate 110 having the hydrophilic layer 130 on a surface thereof, and the second supporting plate 120 in which the hydrophobic liquid material 131 is uniformly disposed in the pixels G surrounded by the pixel wall 127 formed on a surface thereof may be separately prepared, and thus the display constructed by adhering the substrates 110 and 120 to each other has high quality without unevenness.

Even when the first substrate 110, on which the hydrophilic layer 130 is applied, is vertically inverted, a shape variation of the hydrophilic layer 130 is suppressed, and thus handling of the first substrate 110 during manufacturing of an electrowetting display becomes easy. Accordingly, productivity is improved, and thus cost reduction thereof may be realized.

In addition, even when two or more kinds of hydrophobic liquid materials 131, which contain coloring materials different from each other, are stored in the pixels G adjacent to each other, respectively, since the hydrophobic liquid materials 131 are covered with the high-viscosity gel-like hydrophilic layer 130, it is possible to prevent a problem in which the coloring materials are mixed with each other, a mixed color is generated, and thus a display quality decreases.

In addition, when viscosity of the hydrophilic layer 130 is adjusted, the hydrophobic liquid material 131 may be allowed to move at a high speed during voltage application. Accordingly, a display excellent in high-speed responsiveness may be provided.

In addition, in a method of manufacturing the electrowetting display in the related art, only one kind of (one color) hydrophobic liquid is used, and thus it is necessary to provide a separate color filter on any one of a first substrate 110 side or a second substrate side in order for the obtained electrowetting display to perform multi-color display. Conversely, in the method of manufacturing the electrowetting display 100 related to this embodiment, since two or more kinds of the hydrophobic liquid materials 131, which contain coloring materials different from each other, are stored in the pixels G surrounded by the pixel wall 127 different in each case, even when the color filter is not provided, multi-color display may be performed.

In addition, according to this embodiment, since the height H of the pixel wall 127 is set to be 2 to 20 times the height H1 during a voltage not-application state (refer to FIG. 2), a high-quality image, in which contamination (display unevenness) of a display screen is suppressed due to the hydrophobic liquid 131, may be displayed.

In addition, since the surface of the second substrate 120 on a side at which the pixel wall 127 is provided, and the pixel wall 127 are set to have hydrophobicity due to the hydrophobic intermediate layer 128, the hydrophobic liquid material 131 is uniformly stored in the pixels G, and the interface shape between the hydrophilic layer 130 and the hydrophobic liquid material 131 during stoppage of the voltage application varies at a high speed. Accordingly, a high-quality image, which is excellent in responsiveness and in which unevenness is reduced, may be displayed.

In the above-described embodiment, description has been made with respect to the electrowetting display 100 (display device) having a structure in which the first substrate 110 and the second substrate 120 are adhered to each other with the hydrophilic layer 130 formed from the gel-like material, but the invention is applicable to an electrowetting device that is applicable to not only the display device but also an optical lens, a light modulation device, a heat ray control device, and the like by appropriately changing a material that is used as the hydrophobic liquid material 131.

(Second Embodiment)

The present inventors have found that in a case of introducing a drive system (hereinafter, may be referred to as an upper and lower drive system) in which a drive portion is provided to both of upper and lower substrates within a cell of an electrowetting device, when the electrowetting device is used as a display (display device), bright and high-contrast color display may be carried out. As a result, they have accomplished a configuration related to this embodiment. Hereinafter, a configuration related to a second embodiment of the electrowetting display will be described. Here, the same reference numerals will be given to the same members as the first embodiment, and detailed description thereof will be omitted or simplified.

Figure 7:
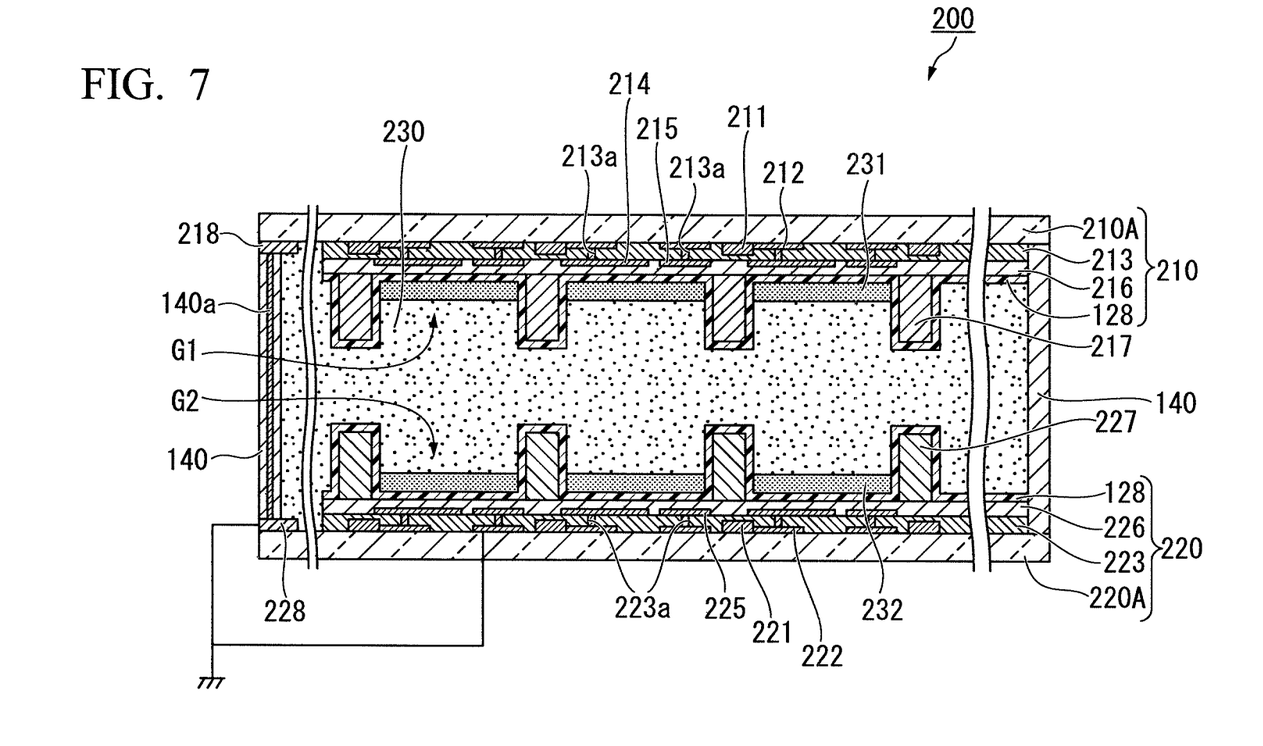
FIG. 7 is a diagram illustrating a cross-sectional configuration of an electrowetting display related to a second embodiment.
Figure 8:
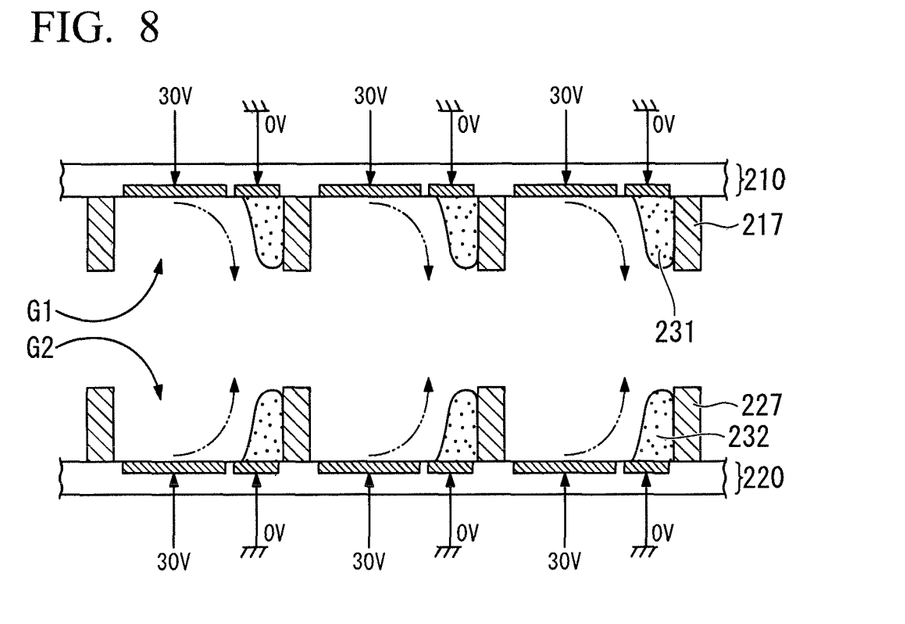
FIG. 8 is a diagram illustrating a white color display state.
Figure 9:
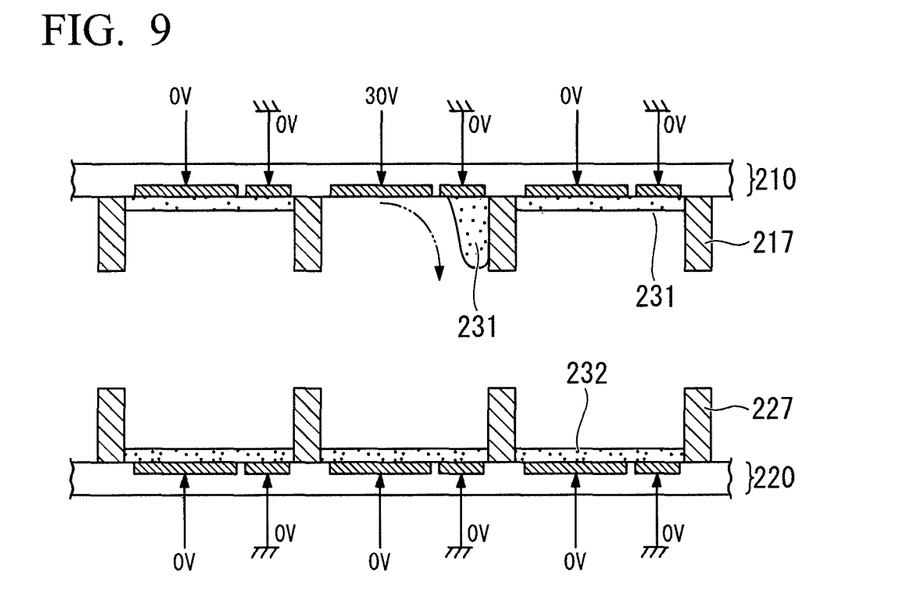
FIG. 9 is a diagram illustrating a color display state.

FIG. 7 shows a diagram illustrating a cross-sectional configuration of the electrowetting display related to the second embodiment. FIGS. 8 and 9 show diagrams illustrating an operation of the electrowetting display, in which FIG. 8 shows a state (white color display state) in which an interface shape between a hydrophilic material and a hydrophobic liquid material is caused to vary by applying a voltage to an electrode on an upper surface side, and FIG. 9 shows a state (a color display state other than a white color) different from FIG. 8. In addition, in FIGS. 8 and 9, drawing of members not necessary for description is simplified.

As shown in FIG. 7, the electrowetting display 200 related to this embodiment includes a first substrate 210 and a second substrate 220, and these substrates 210 and 220 are disposed to be opposite to each other through a hydrophilic material 230. The hydrophilic material 230 is disposed at a region partitioned by a sealing member 140 that is provided along the outer periphery of the substrates 210 and 220. In this specification, the "cell" represents a region between the first substrate 210 and the second substrate 220, and the hydrophilic material 230 and hydrophobic liquid materials 231 and 232 to be described later are disposed in the region. In addition, an inter-substrate conduction portion 140a, which allows conduction between the first substrate 210 and the second substrate 220, is buried in a sealing member 140.

The first substrate 210 includes a base material 210A, a TFT 211, a wiring portion 212, a planarization film 213, a pixel electrode 214, a common electrode 215, and an insulating film 216. The base material 210A is constituted by, for example, materials such as glass, a resin molded body, and a film that are commonly used as a panel substrate of a display device. In this embodiment, for example, the glass is used. The pixel electrode 214 and the common electrode 215 are formed on the planarization film 213, and are connected to the TFT 211 and the wiring portion 212 through a contact hole 213a. A conductive portion 218, which conducts to the second substrate 220 side through the inter-substrate conduction portion 140a provided in the sealing member 140, is formed At an end portion of the base material 210A. The conductive portion 218 comes into contact with the hydrophilic material 230 and thus has the same electric potential. In addition, the conductive portion 218 is electrically connected to the common electrode 215 through the wiring portion 212 in a region (not shown).

A first pixel wall 217 is formed on the insulating film 216 of the first substrate 210. The first pixel wall 217 is formed in a lattice shape, and partitions a plurality of pixels G1 on the first substrate 210. The pixel electrode 214 and the common electrode 215 are disposed in each of the pixels G1 in a pair.

A hydrophobic liquid material (first hydrophobic liquid material) 231 is stored in regions (pixels G1) partitioned by the first pixel wall 217.

On the other hand, the second substrate 220 includes a base material 220A, a TFT 221, a wiring portion 222, a planarization film 223, a pixel electrode 224, a common electrode 225, and an insulating film 226. The base material 220A is constituted by, for example, materials such as glass, a resin molded body, and a film that are commonly used as a panel substrate of a display device. In this embodiment, for example, the glass is used. The pixel electrode 224 and the common electrode 225 are formed on the planarization film 223, and are connected to the TFT 221 and the wiring portion 222 through a contact hole 223a. A conductive portion 228, of which part is led out to the outside of the sealing member 140, is formed at an end portion of the base material 220A. The conductive portion 228 comes into contact with the hydrophilic material 230 and thus has the same electric potential. The conductive portion 228 is connected to the common electrode 225, which is provided to the second substrate 220, at the outside, and each of these is grounded. In addition, the conductive portion 228 is electrically connected to the common electrode 215 on a first substrate 210 side through the inter-substrate conduction portion 140a provided inside the sealing member 140. According to this, the common electrode 215 on the first substrate 210 side has the same electric potential (grounded state) as the common electrode 225 on the second substrate 220 side through the conductive portion 228.

In addition, it is preferable that a plurality of the inter-substrate conduction portions 140a, the conductive portions 218 and 228 be provided in the cell. In this configuration, a variation of an electric potential of the hydrophilic material 230 in the cell may be removed.

A second pixel wall 227 is formed on the insulating film 226 of the second substrate 210. The second pixel wall 227 is formed in a lattice shape, and partitions a plurality of pixels G2 on the second substrate 220. The pixel electrode 224 and the common electrode 225 are disposed in each of the pixels G in a pair. A hydrophobic liquid material 232 is stored in regions (pixels G2) partitioned by the second pixel wall 227.

Here, the first pixel wall 217 that is formed on the first substrate 210 side and the second pixel wall 227 that is formed on the second substrate 220 side overlap each other in a plan view. That is, the pixels G1 partitioned by the first pixel wall 217 and the pixels G2 partitioned by the second pixel wall 227 overlap each other in a plan view.

The hydrophilic material 230 is not particularly limited, and for example, a nonionic liquid with high polarizability is preferable. Specific examples thereof include water, monovalent or polyvalent alcohols with low molecular weight such as methyl alcohol, ethyl alcohol, and ethylene glycol, and the like. These hydrophilic liquids may be used alone or in combination of two or more kinds. As the hydrophilic material 230, a material, which gelates or solates as described in the first embodiment, may be used.

The hydrophobic liquid material 231 is not particularly limited as long as this material is a hydrophobic liquid having light shielding properties, and for example, a hydrophobic solvent, which contains a dye and/or pigment not allowing visible light to transmit therethrough and is colored with the dye and/or pigment, is used. The hydrophobic solvent is not particularly limited, and examples thereof include alkanes such as decane, undecane, dodecane, and hexadecane, silicone oil, fluorocarbon, and the like. These hydrophobic solvents may be used alone or in combination of two or more kinds. The dye or pigment is not particularly limited, and for example, it is possible to use various kinds of pigments or dyes such as an inorganic pigment or dye, an organic pigment or dye such as phthalocyanine and azos, and the like. With regard to characteristics of a solution that is used for the electrowetting, it is necessary for the solution to be dissolved in the hydrophobic liquid, but not to be dissolved in the hydrophilic liquid. The pigment or dye is used after a surface thereof is subjected to a hydrophobic treatment. For example, metal oxides such as iron and chromium, sulfides, and the like may be exemplified. In addition, reduced materials such as titanium oxide, carbons such as Ketjen Black may be exemplified. A complex of a metal such as iron is also used.

In this embodiment, as the hydrophobic liquid material 231, a hydrophobic pigment mixture, which is obtained by dissolving carbon black having a hydrophilic surface in hexadecane in a concentration of 5 wt %, is used.

In addition, the hydrophobic liquid material 232 contains the hydrophobic solvent and the coloring material. As the hydrophobic solvent, the above-described solvent may be exemplified. In addition, the coloring material is not particularly limited, and it is possible to use various kinds of pigments or dyes such as an inorganic pigment or dye, an organic pigment or dye such as phthalocyanine, azos, and anthraquinone, and the like. With regard to characteristics of a solution that is used for the electrowetting, it is necessary for the solution to be dissolved in the hydrophobic liquid, but not to be dissolved in the hydrophilic liquid. The pigment or dye is used after a surface thereof is subjected to a hydrophobic treatment.

In the electrowetting display 200 related to this embodiment, two or more kinds of the hydrophobic liquid materials 232, which contain coloring agents different from each other, are stored in the pixels G2 surrounded by the second pixel wall 227 different in each case, respectively. According to this configuration, even when a color filter is not provided either on a first substrate 210 side or on a second substrate 220 side, multi-color display may be realized.

As the hydrophobic liquid materials 232 that are stored in the pixels G2 surrounded by the second pixel wall 227 in the case of performing color display, it is preferable to use three kinds of hydrophobic liquid materials (for example, corresponding to RGB (Red, Green, Blue) or CMY (Cyan, Magenta, Yellow)) or four kinds hydrophobic liquid materials (for example, corresponding to RGGB (Red, Green, Green, Blue) or RGBY (Red, Green, Blue, Yellow)).

In this embodiment, three kinds of hydrophobic liquid materials 232, which are obtained by dissolving Blue No. 403, Yellow No. 204, and Red No. 225 (manufactured by Kiriya Chemical Co., Ltd.) in hexadecane (manufactured by Wako Pure Chemical Industries, Ltd.), respectively, in such a manner that each pigment becomes 2.5 wt %, are used as the coloring material.

In the electrowetting display 200, when a predetermined voltage (for example, 30 V) is applied to the pixel electrode 224 on a second substrate 220 side, a degree of hydrophobicity on a surface of the pixel electrode 224 is mitigated, and a degree of hydrophilicity becomes strong, and thus the hydrophilic material 230 may be attracted. At this time, a shape of the hydrophobic liquid material 232, which gets familiar with the pixel electrode 224, is changed to a shape that is convex on the common electrode 225 due to a force of the hydrophilic material 230. As described above, when the hydrophobic liquid material 232 in the pixels G2 is selectively allowed to move onto the common electrode 225, a color of light that transmits through each of the pixels G2 may be changed.

On the other hand, in the electrowetting display 200, when a predetermined voltage (for example, 30 V) is applied to the pixel electrode 214 on a first substrate 210 side, a degree of hydrophobicity on a surface of the pixel electrode 214 is mitigated, and a degree of hydrophilicity becomes strong, and thus the hydrophilic material 230 may be attracted. At this time, a shape of the hydrophobic liquid material 231, which gets familiar with the pixel electrode 214, is changed to a shape that is convex on the common electrode 215 due to a force of the hydrophilic material 230 (refer to FIGS. 8 and 9). As described above, when the hydrophobic liquid material 231 having light shielding properties in the pixels G1 is selectively allowed to move onto the common electrode 215, the hydrophobic liquid material 231 functions as a shutter that allows light to transmit through each of the pixels G1 or shields the light.

Accordingly, as shown in FIG. 8, when allowing the hydrophobic liquid materials 231 and 232 in all of the pixels G1 and G2 to move so as to form a convex shape, a white color image may be displayed. In addition, as shown in FIG. 9, when allowing only the hydrophobic liquid material 231 only in the pixels G1 corresponding to a predetermined color to move so as to form a convex shape, light of other pixels is shielded by the hydrophobic liquid material 231 having the light shielding properties, and thus an image of a predetermined color may be displayed.

However, when the first pixel wall 217 and the second pixel wall 227 have hydrophilicity, wettability between the hydrophilic material 230 and the pixel walls 217 and 227 becomes high, and wettability between the hydrophobic liquid materials 231 and 232 and the respective pixel walls 217 and 227 becomes low, and thus energy in interface change at surfaces of the pixel walls 217 and 227 from the hydrophilic material 230 to the hydrophobic liquid materials 231 and 232 increases. As a result, this becomes a cause of unevenness during voltage application.

Therefore, this embodiment has a configuration in which the hydrophobicity is applied to a surface of the first substrate 210 on a side at which the first pixel wall 217 is provided, the first pixel wall 217, a surface of the second substrate 220 on a side at which the second pixel wall 227 is provided, and the second pixel wall 227. With regard to a method of applying hydrophilicity, the hydrophobic intermediate layer 128 is formed using a polytetrafluoroethylene solution similarly to the first embodiment.

As described above, not only the surface of the first substrate 210 and the second substrate 220 on sides at which the pixel walls 217 and 227 are provided but also the pixel walls 217 and 227 themselves are set to have hydrophobicity, and thus the hydrophobic liquid materials 231 and 232 may be stored in regions (pixels G1 and G2) surrounded by the respective pixel walls 217 and 227 of the first substrate 210 and the second substrate 220 in a relatively uniform manner. Furthermore, a variation of the interface shape between the hydrophilic material 230 and the hydrophobic liquid materials 231 and 232 during stoppage of the voltage application may be allowed to occur at a high speed. Accordingly, the electrowetting display 200 that is obtained becomes excellent in responsiveness.

On the basis of this configuration, the electrowetting display 200 realizes a configuration in which "a drive portion is provided at both of the upper and lower substrates". According to this, when the hydrophobic liquid material 232 is allowed to move onto the common electrode 225 in a desired pixel among the pixels G2 on a second substrate 220 side, a desired color is displayed for each of the pixels G2. In addition, when the hydrophobic liquid material 231 is allowed to move onto the common electrode 215 in a desired pixel among the pixels G1 on a first substrate 210 side, transmission of light from a corresponding pixel among the pixels G2 is allowed. Accordingly, a full color image may be displayed without providing a color filter to any of the first substrate 210 and the second substrate 220. In addition, each of the pixels G1 on a first substrate 210 side functions as a shutter, a bright and high-contrast image may be displayed.

Next, description will be made with respect to an example of a method of manufacturing the electrowetting display 200.

First, the first substrate 210 and the second substrate 220 that are manufactured by a method in the related art are prepared, and the first pixel wall 217 and the second pixel wall 227 are formed in the first substrate 210 and the second substrate 220, respectively, with a height of 40 μm by using a photoresist (SU-8; manufactured by NIPPON KAYAKU Co., Ltd.).

Subsequently, with regard to the first substrate 210 having the first pixel wall 217 and the second substrate 220 having the second pixel wall 227, the hydrophobic intermediate layer 128 is coated on the entire surfaces of the first pixel wall 217, the second pixel wall 227, the first substrate 210, and the second substrate 220 by a spin coating method using a polytetrafluoroethylene solution (AF1600; manufactured by Du Pont Kabushiki Kaisha). In addition, the hydrophobic pixel walls 217 and 227 may be formed by using a dry photoresist, an acrylic photoresist, or the like.

In this embodiment, since the pixel walls 217 and 227 and the surfaces of the first substrate 210 and the second substrate 220, which constitute the pixels G1 and G2, are set to have hydrophobicity due to the hydrophobic intermediate layer 128, unevenness may be prevented from occurring in the hydrophobic liquid materials 231 and 232 disposed in the respective pixels G1 and G2.

The hydrophobic liquid material 231 having light shielding properties is disposed in the respective pixels G1 of the first substrate 210 having the hydrophobic intermediate layer 128, respectively, by an inkjet device. Similarly, three kinds of the hydrophobic liquid materials 232 are disposed in the respective pixels G2 of the second substrate 220 having the hydrophobic intermediate layer 128, respectively, by an inkjet device. After disposing the hydrophobic liquid materials 231 and 232, these are left as is at room temperature, whereby the thickness of the hydrophobic liquid materials 231 and 232 that are disposed in the pixels G1 and G2 is set to 5 μm. That is, in this embodiment, the height H of the pixel walls 217 and 227 is set to be 8 times the height H1 of the hydrophobic liquid materials 231 and 232 in the voltage not-application state.

A method of disposing the hydrophobic liquid materials 231 and 232 in the pixels G1 and G2 is not particularly limited, and for example, screen printing, slit coating, flexography, a gravure printing method, a dispensing method, a spin coating method, or the like may be used in addition to the inject method.

Subsequently, the first substrate 210 and the second substrate 220 are adhered to each other through the hydrophilic material 230. Specifically, the base material 210A (second substrate 210) on which the sealing member 140 is disposed along the outer periphery thereof is prepared, and then the hydrophilic material 230 is disposed at an inner side of the base material 210A. The hydrophilic material 230 may a material which is obtained by adding a gelling agent to a hydrophilic liquid and which is present in a gel state even in room temperature, or may be a material which gelates during manufacturing of the electrowetting display 100 by lowering a temperature or the like, and returns to a liquid phase at room temperature after the manufacturing. When this gelated material is used, even when being vertically inverted, the thickness of the gelated material does not greatly vary. The base material 210A is vertically converted, and the first substrate 210 and the second substrate 220 are satisfactorily adhered through the sealing member 140.

The adhesion between the first substrate 210 and the second substrate 220 may be carried out by applying the gel-like hydrophilic material 230 on one surface of a transparent film, adhering the hydrophilic material 230 of the film to the first substrate 210 on a first pixel wall 217 side, further applying the hydrophilic material 230 on the other surface of the film, and adhering the hydrophilic material 230 of the film to the second substrate 220 on a second pixel wall 227 side.

As described above, according to the electrowetting display 200 related to this embodiment, the hydrophilic material 231 having light shielding properties in the pixels G2 on a first substrate 210 side may be driven by an electrowetting effect, and thus a bright and high-contrast image may be obtained.

In addition, according to this embodiment, since the height H of the pixel walls 217 and 227 are set to be 2 to 20 times the height H1 during a voltage not-application state, a high-quality image, in which contamination (display unevenness) of a display screen is suppressed due to the hydrophobic liquids 231 and 232, may be displayed.

In addition, since the surface of the first substrate 210 and the second substrate 220 on sides at which the pixel walls 217 and 227 are provided, and the pixel walls 217 and 227 are set to have hydrophobicity due to the hydrophobic intermediate layer 128, the hydrophobic liquid materials 231 and 232 are uniformly stored in the pixels G1 and G2, and the interface shape between the hydrophilic material 230 and the hydrophobic liquid materials 231 and 232 during stoppage of the voltage application varies at a high speed. Accordingly, a high-quality image, which is excellent in responsiveness and in which unevenness is reduced, may be displayed.

In addition, a pulse voltage of 20 V was applied at a cycle of 10 Hz with respect to the electrowetting display 200 related to the second embodiment, and the electrowetting display 100 related to the first embodiment, and then contrast of a display image was evaluated. The contrast of the electrowetting display 100 related to the first embodiment was 10 or less, and the contrast of the electrowetting display 200 related to the second embodiment was 20. It was confirmed that the contrast may be improved by adapting a structure of the upper and lower drive system related to the embodiments as described above.

(Evaluation)

An effect (whether or not display unevenness occurs) of the electrowetting display of the invention will be described.

Table 1 shows evaluation results about whether or not display unevenness occurs. In Table 1, Example 1 represents a case where in the electrowetting display 200 related to the second embodiment, a material, which was obtained by dissolving carbon black having a hydrophilic surface in hexadecane in a concentration of 5 wt %, was used as the hydrophobic liquid material 232. In addition, in Table 1, Comparative Example 1 corresponds to an electrowetting display having the same configuration as Example 1 except that the height of the first pixel wall 217 is set to 5 p.m. In addition, Comparative Example 2 corresponds to an electrowetting display having the same configuration as Example 1 except that the hydrophobic intermediate layer 128 is formed only on a surface of the second substrate 220, the second pixel wall 227 is not subjected to a hydrophobic treatment, and thus the second substrate 220 having a hydrophilic second pixel wall 227 is provided.

TABLE 1

| | DISPLAY UNEVENNESS | |
|---|---|---|
| | DURING VOLTAGE APPLICATION | DURING VOLTAGE NOT-APPLICATION |
| Example 1 | O | O |
| Comparative Example 2 | O | x |
| Comparative Example 3 | x | O |

In this evaluation, the respective displays of Example 1 and the Comparative Examples 1 and 2 were vertically installed, and a pulse voltage of 20 V was applied at a cycle of 10 Hz, respectively. Then, after application for 10 hours, results of evaluation about unevenness of a display screen, which was performed with respect to the respective electrowetting displays during voltage application and during voltage not-application, are shown in Table 1. "O" is given to a case in which the display unevenness did not occur, and "x" is given to a case in which the display unevenness occurred.

As can be seen from Table 1, similarly to the configuration related to Comparative Example 1, when the height of the first pixel wall 217 is set to be as low as 5 μm compared to Example 1, the display unevenness occurs during voltage not-application. This result represents an effect that is obtained by defining the height H of the first pixel wall 217 on the basis of the height H1 of the hydrophobic liquid material 231. That is, similarly to Example 1, when the height H of the first pixel wall 217 is set to be 2 to 20 times the height H1 of the hydrophobic liquid material 231 in a voltage not-application state, it is confirmed the contamination (display unevenness) of a display screen due to the hydrophobic liquid 231 may be suppressed.

In addition, similarly to the configuration related to Comparative Example 2, when the second pixel wall 227 is set to have hydrophilicity differently from Example 1, from Table 1, it can be confirmed that the display unevenness occurs during voltage application. This result represents that it is important for the second pixel wall 227 to be set to have hydrophilicity in addition to the surface of the second substrate 220. That is, similarly to Example 1, when the second pixel wall 227 is also set to have hydrophilicity, it is confirmed that the unevenness during voltage application may be suppressed.

Figure 10:
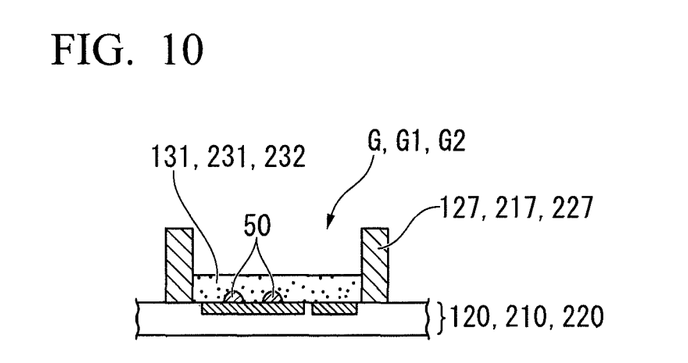
FIG. 10 is a diagram illustrating a configuration related to a modification example.

The invention is not limited to the following embodiments, and may be appropriately modified within a range not departing from the gist of the invention. For example, as shown in FIG. 10, with regard to the first embodiment and the second embodiment, a protrusion 50 lower than the pixel walls 127, 217, and 227 may be formed in the respective pixels G, G1, and G2 in which the hydrophobic liquid materials 131, 231, and 232 are stored. In addition, instead of the protrusion 50, an undulation having a height lower than the height of the pixel walls 127, 217, and 227 may be provided.

When the protrusion 50 or the undulation is provided, the hydrophobic liquid materials 131, 231, and 232, which are stored in the regions (pixels G, G1, and G2) surrounded by the pixel walls 127, 217, and 227, have a large-thickness portion and a small-thickness portion in a state in which a voltage is not applied, and due to the small-thickness portion, the interface shape between the hydrophilic liquid (the hydrophilic layer 130 or the hydrophilic material 230) and the hydrophobic liquid materials 131, 231, and 232 may be made to easily vary during voltage application. Accordingly, an amount of the hydrophobic liquid materials 131, 231, and 232 that remain in the pixels G, G1, and G2 during voltage application may be controlled with accuracy, and thus a depth of an intermediate color may be controlled with accuracy by controlling a value of voltage that is lower than a maximum application voltage, whereby gradation display of a color image may be carried out in a satisfactory manner.

REFERENCE SIGNS LIST

50: Protrusion
100, 200: Electrowetting display
110, 210: First substrate
120, 220: Second substrate
127: Pixel wall
128: Hydrophobic intermediate layer
130: Hydrophilic layer
131: Hydrophobic liquid material
217: First pixel wall
227: Second pixel wall
231: Hydrophobic liquid material (first hydrophobic liquid material)
232: Hydrophobic liquid material (second hydrophobic liquid material)

The invention claimed is:

1. An electrowetting display in which each of a pair of substrates constituting one cell has a driving unit,
wherein a first substrate that stores a first hydrophobic liquid material in regions surrounded by a first pixel wall, and a second substrate that stores a second hydrophobic liquid material in regions surrounded by a second pixel wall are adhered to each other through a hydrophilic material.

2. The electrowetting display according to claim 1,
wherein a hydrophobic liquid material having light shielding properties is stored as a first hydrophobic liquid material in the regions surrounded by the first pixel wall, and
two or more kinds of hydrophobic liquid materials, which contain a coloring material, are stored as the second hydrophobic liquid material in the regions surrounded by the second pixel wall, respectively.

3. The electrowetting display according to claim 2,
wherein the second hydrophobic liquid material corresponds to each color of RGB (Red, Green, Blue), CMY (Cyan, Magenta, Yellow), RGGB (Red, Green, Green, Blue), or RGBY (Red, Green, Blue, Yellow).

4. The electrowetting display according to claim 1,
wherein in at least one of each of the regions surrounded by the first pixel wall and each of the regions surrounded by the second pixel wall, a protrusion having a height lower than the height of each of the pixel walls, or an undulation having a height lower than the height of each of the pixel walls is provided.

5. The electrowetting display according to claim 1,
wherein the hydrophilic material is a gel-like material.

6. The electrowetting display according to claim 1,
wherein the height of at least one of the first pixel wall and the second pixel wall is set to be 2 to 20 times the height of the hydrophobic liquid materials, which are stored by the first pixel wall and the second pixel wall, respectively, in a voltage not-application state.

7. The electrowetting display according to claim 1,
wherein in at least one of the first substrate and the second substrate, a surface thereof on a side at which each of the pixel walls is provided, and each of the pixel walls have hydrophobicity.

8. An electrowetting display comprising:
a first substrate;
a second substrate that is disposed to be opposite to the first substrate; and
a hydrophobic liquid material that is stored in regions surrounded by a pixel wall that is provided to the second substrate,
wherein the first substrate and the second substrate are disposed to be opposite to each other through a hydrophilic gel-like material.

9. The electrowetting display according to claim 8,
wherein the hydrophobic liquid material contains a hydrophobic solvent and a coloring material.

10. The electrowetting display according to claim 9,
wherein two or more kinds of the hydrophobic liquid materials, which contain the coloring material having a color different in each case, are stored in regions surrounded by the pixel wall different in each case, respectively.

11. The electrowetting display according to claim 8,
wherein the pixel wall and a surface of the second substrate on a side at which the pixel wall is provided have hydrophobicity.

12. The electrowetting display according to claim 8,
wherein a height of the pixel wall is set to be 2 to 20 times the height of the hydrophobic liquid material that is stored in a voltage not-application state.

13. The electrowetting display according to claim 8,
wherein a surface of the second substrate on a side at which the pixel wall is provided, and the pixel wall have hydrophobicity.

* * * * *